Aug. 23, 1938.   L. LEITZ   2,127,925
COMBINED RANGE FINDER AND VIEW FINDER
Filed Jan. 22, 1936
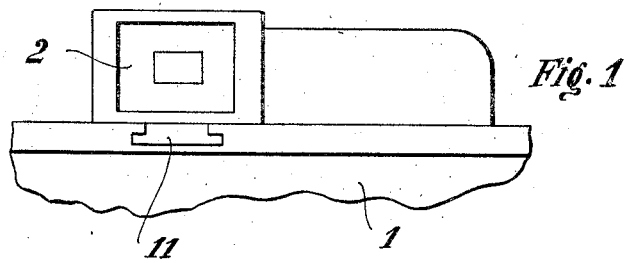
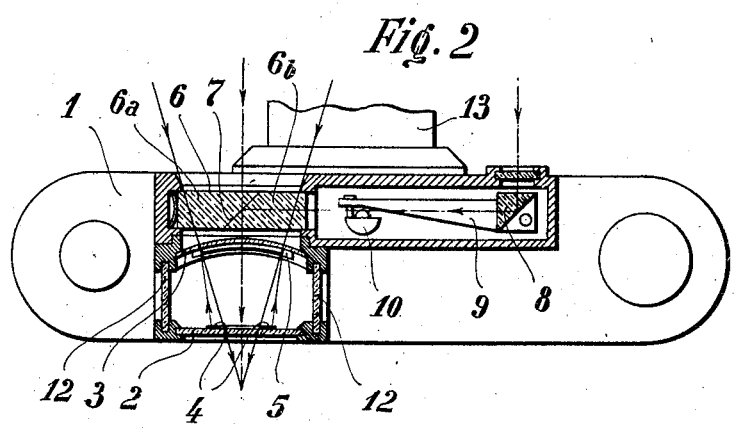
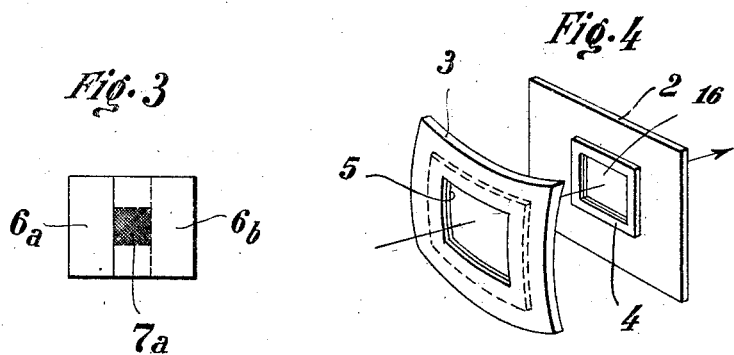
Ludwig Leitz
INVENTOR
BY Ivan E. A. Konigsberg
ATTORNEY Patented Aug. 23, 1938

2,127,925

UNITED STATES PATENT OFFICE 2,127,925

COMBINED RANGE FINDER AND VIEW FINDER

Ludwig Leitz, Wetzlar, Germany, assignor to Ernst Leitz, G. m. b. H., Wetzlar, Germany Application January 22, 1936, Serial No. 60,160
In Germany January 31, 1935

2 Claims. (Cl. 95—44)

The object of this invention is to provide a combined direct view finder and a basis range finder in a unitary construction in which the optical axis of the view finder coincides with the direct observation axis of the range finder. Another object of the invention is to embody the principles thereof in a construction especially well adapted for use in miniature or small cameras. Such a combination presents a difficult problem because in the view finder with direct view it is desirable that there be but little minifying of the object, whereas in the range finder it is desirable that there be but little magnification of the object, because naturally one desires that the two overlapping images shall be of the same size. In solving the problem it has been found most practical to select a proportion between the two incoming images which is usually expressed as 1:1, i. e. the images should be equal in size and this which may be carried out with cameras having bodies of relatively considerable depth. In such cameras the construction has been embodied in a combination of a terrestial telescope and a view finder with a mask to define the field of view. Such a construction is however not practical for small cameras, i. e. cameras having but little depth of body because the terrestial telescope is too long and the distance for the mask finder is too short to afford a simultaneous sharp observation of the mask and the object.

View finders, which in accordance with the collimator principle include marks or mask to limit the field of view, such marks or masks being imaged so as to appear at an infinite distance, may be constructed to take up very little space and may therefore be combined with a range finder and the combined device used to advantage with small cameras having but little space behind the objective. The view finder consists in a known manner of a frame which carries one or more masks which are reflected in infinity in a curved surface which is partly silvered and functions in the manner of a concave mirror. In accordance with this invention there is mounted a partly silvered plane surface in the optical axis of the view finder in such a manner that the reflected image from the range finder appears as a small insert in the field of view seen through the view finder. In order to prevent disturbing image contours from appearing in the directly observed image, which contours may result from the reflections from the range finder, the invention includes the use of a glass body which does not obstruct the direct observation through the view finder and which glass body contains or bears the above mentioned partly silvered plane surface.

The invention and its objects will be more fully understood from the following specification read in connection with the accompanying drawing in which Fig. 1 is a rear view of the view finder mounted on a camera.

Fig. 2 is a sectional view showing the arrangement of the parts in a camera.

Fig. 3 illustrates the partly silvered glass body.

Fig. 4 shows certain elements of the view finder.

Referring to the drawing the numeral 1 denotes a photographic camera having an objective 13 and provided with a unitary finder housing adapted to be attached to the camera by means of a foot 11. The finder housing contains a combined view finder and a range finder in accordance with this invention. The view finder includes a rear transparent member 2 forming an eye opening 16 surrounded by a rectangular mark or frame 4 which may simply be painted upon the member 2, and which is indicated by heavy lines in Fig. 2. Suitably spaced in front of the member 2 there is a transparent concave glass body 3 provided with a concave partly silvered rectangular frame portion 5 which frames the field of view seen through the glass body 3. The centres of the two rectangular frames 2 and 3 are coincidental with the axis of the view finder and the proportions are such that the frame or mark 4 is imaged in infinity in the partly silvered portion 5. The frame 4 is located in the focal plane of the frame portion 5. The construction, function and arrangement of the view finder so far described is similar to the photographic view finder disclosed in the U. S. Patent 2,093,299 of September 14, 1937. In front of the concave glass body 3 there is mounted a glass body 6 which consists of two cemented parts 6a and 6b, which have a common inclined surface 7 provided with a partly silvered portion 7a, see Figure 3. To one side of the glass body 6 there is secured the range finder comprising the movable reflecting prism 8 operated from a part 10 by means of an arm 9. The part 10 is actuated by the objective 13 in a known manner. The mark or frame 4 receives light through the windows 12 in Figure 2 so that it may be clearly and sharply observed in the partly silvered portion 5 in which the mark 4 is imaged in infinity, the mark being in the focal plane of the portion 5.

In operation, when one looks into the view finder, one sees in the field of view the image of the rectangular mark 4 as the same is reflected in the rectangular partly silvered frame portion 5. That is, one sees a rectangular frame formed by the reflected image of the mark 4 and this frame encloses the view which will be photographed. As the objective is being focused, the range finder is actuated in a well known manner and now one sees inside the reflected image of the mark 4 two images, one of which is the image of the entire field of view appearing through the view finder and the other image which is reflected from the range finder is smaller and is only a central portion of said image. The small image is now superimposed upon the large image as the objective is being focused. When the objective is in focus the small image coincides completely with the corresponding central portion of the large image so that one sees in fact only a single image which is that of the field of view which will be photographed. The incoming small image is easily seen as it comes into view and appears within the frame against the wholly unobstructed view through the view finder. A diminution of light occurs thus only in the central portion where the two images are superimposed.

I claim:

1. In a photographic camera having an objective, a combined coincidence range finder and a photographic view finder, the latter comprising a transparent ocular member, forming an eye opening, a rectangular mark on the objective side of said member defining and surrounding said eye opening, a concave transparent member spaced a distance in front of said ocular member, a concave partly silvered rectangular frame portion on said concave member facing the said mark for reflecting the same in infinity to frame the field of view, a wholly transparent glass body in front of the said view finder provided with a centrally disposed partly silvered semi-transparent surface for reflecting the central portion of the image from the range finder into the optical axis of the view finder to appear centrally within the framed field of view superimposed thereupon when the said range finder is operated and means actuated by the objective for operating the range finder.

2. In a photographic camera having an objective, a combined coincidence range finder and a photographic view finder comprising a unitary housing having light admitting openings for said finders and a single eye opening common to both of said finders, said view finder including a transparent ocular member forming an eye opening, a rectangular mark on the objective side of said member defining and surrounding said eye opening, a concave transparent member spaced a distance in front of said ocular member, a concave partly silvered rectangular frame portion on said concave member facing the said mark for reflecting the same in infinity to frame the field of view, light admitting side openings in said housing for illuminating the said rectangular mark, a wholly transparent glass body in front of the said view finder provided with an inclined centrally disposed partly silvered semi-transparent surface for reflecting the central portion of the image from the range finder into the optical axis of the view finder to appear centrally within the framed field of view superimposed thereupon when the said range finder is operated, means actuated by the objective for operating the range finder and cooperating means on the camera and the said housing for detachably securing the housing to the camera.

LUDWIG LEITZ.

CERTIFICATE OF CORRECTION.

Patent No. 2,127,925. August 23, 1938.

LUDWIG LEITZ.

It is hereby certified that error appears in the printed specification of the above numbered patent requiring correction as follows: Page 1, first column, line 20, strike out the word "which"; and that the said Letters Patent should be read with this correction therein that the same may conform to the record of the case in the Patent Office.

Signed and sealed this 11th day of October, A. D. 1938.

Henry Van Arsdale (Seal) Acting Commissioner of Patents.